May 23, 1950     W. D. CAMPBELL     2,508,661

APPARATUS FOR TRANSPORTING HEAVY OBJECTS

Filed Jan. 27, 1947     2 Sheets-Sheet 1

INVENTOR
WILLIAM D. CAMPBELL
BY Paul, Paul & Moore
ATTORNEYS

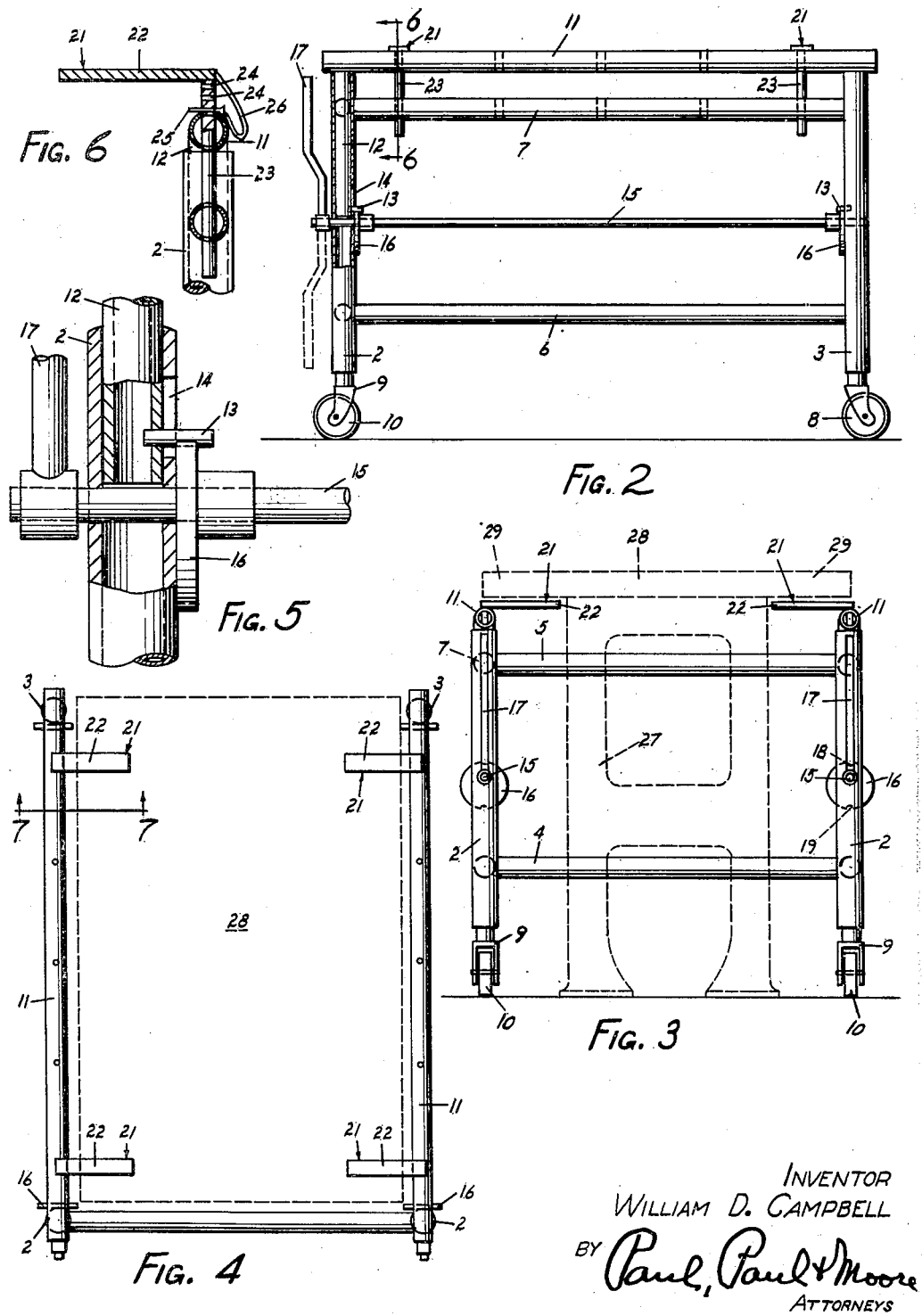

Patented May 23, 1950

2,508,661

UNITED STATES PATENT OFFICE 2,508,661

APPARATUS FOR TRANSPORTING HEAVY OBJECTS

William D. Campbell, Minneapolis, Minn., assignor to Munsingwear, Inc., Minneapolis, Minn., a corporation of Delaware Application January 27, 1947, Serial No. 724,539

5 Claims. (Cl. 254—2)

This invention relates to new and useful improvements in apparatus for transporting heavy articles or objects from one place to another, and more particularly to such apparatus which may be quickly maneuvered into load-engaging position to bodily lift the load from the floor, and whereby the load may be readily and conveniently transported from one place to another without effort.

In the operation of industrial plants, it becomes necessary at times to shift heavy equipment, such as machines and other apparatus from one place to another, perhaps to make room for new equipment or to rearrange old equipment to facilitate and expedite manufacturing processes. This is particularly true in large knitting plants where a great many table mounted sewing machines are usually employed, which are frequently juggled around or rearranged to expedite work operations. In such places, it is therefore highly desirable that some means be provided whereby such shifting of equipment from one place to another may be quickly performed with a minimum loss of time and labor than has heretofore been required to accomplish such work.

An object of the present invention therefore is to provide a wheeled frame which is open at one end whereby it may be quickly and conveniently maneuvered into position about a sewing machine, or other piece of equipment, with its load-engaging members in proper position to engage the load, and whereby when the operating means for said members is subsequently actuated, said members may engage the load and bodily lift it from the floor, whereby the entire weight of the article or load will be transferred onto said wheeled frame, after which the sewing machine or other piece of equipment supported on said wheeled frame may be quickly and conveniently transported to any desired location or position in the plant by simply shoving the wheeled frame along the floor.

A further object is to provide such an apparatus which is light in weight and is extremely simple and inexpensive in construction whereby it may be manufactured at low cost, and also whereby it may be conveniently wheeled about from one place to another whether loaded or unloaded with a minimum of effort, thereby greatly facilitating the operation of rearranging equipment, or transporting it from one place to another in an industrial plant, or elsewhere, as will be understood.

Other objects of the invention reside in the general design of the apparatus whereby it provides the utmost in simplicity; in the means provided for vertically translating the load-engaging members in the sides of the apparatus whereby when the apparatus has been positioned about a load or object to be transported, the load-engaging members may be quickly moved into engagement with the load and elevated to bodily lift the load from the floor and transfer its weight onto the apparatus; in the auxiliary load-engaging elements which are adjustably supported on the load-engaging side members of the apparatus whereby the apparatus may be utilized for transporting loads at varying widths and heights; and in the means provided for elevating the load-engaging members which preferably includes a plurality of eccentrics adapted to be operated by a pair of spaced operating levers.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 2 is a side elevation of Figure 1, partially broken away to more clearly illustrate the means for vertically translating the load-engaging members of the apparatus;

Figure 3 is a rear view of the apparatus;

Figure 4 is a top view thereof;

Figure 5 is an enlarged detail view on the line 5—5 of Figure 7;

Figure 6 is an enlarged detail sectional view substantially on the line 6—6 of Figure 2;

Figure 7:
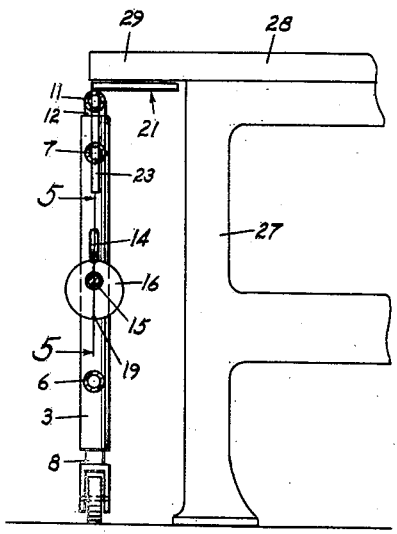
Figure 7 is a detail sectional view on the line 7—7 of Figure 4, showing one of the load-engaging members of the apparatus positioned beneath the overhanging table top of a machine to be transported by the apparatus.

The novel apparatus herein disclosed is shown comprising an open structural frame, preferably constructed of tubular stock and comprising tubular corner posts or uprights 2 and 3 at each side of the apparatus. The posts 2—2 at the rear end of the frame are shown tied together by suitable cross members 4 and 5, to provide a U-shaped frame, when viewed as shown in Figure 4.

Tubular side frame members 6 and 7 are interposed between the corner posts 2 and 3 at each side of the structure and cooperate with the cross members 4 and 5 to provide a very rugged and substantial frame. The corner posts 2 and 3, and the horizontal frame members 4, 5, 6 and 7 are preferably welded together to provide, in effect, a unitary structure having considerable strength and rigidity, but which is relatively light in weight, and convenient to grasp with the hands.

To facilitate the description of the apparatus, the open end of the frame will hereinafter be referred to as the "front end," and the opposite end, the "rear end." Suitable swivel casters 8 are provided on the front posts or uprights 3—3 and stationary brackets 9 having wheels 10 mounted therein are shown secured to the lower ends of the rear tubular uprights 2—2 to facilitate moving and guiding the structure about from one place to another.

An important feature of the present invention resides in the means provided at each side of the structure for engaging the article or load to be carried.

The means provided for thus engaging the load, is shown comprising a pair of longitudinally extending load-engaging members 11—11. One such member is located at each side of the apparatus directly above the side rails 7. Each member 11 is shown provided at each end with a depending tubular portion or guide rod 12 which are telescopically received in the upper ends of their respective corner posts 2 and 3, as perhaps best illustrated in the left-hand end of Figure 2. Each guide rod 12 is shown having a pin or stud 13 secured thereto adjacent its lower end which studs are vertically movable in suitable slots 14 provided in the upper wall portions of the uprights 2 and 3, as clearly illustrated in Figures 1, 2 and 5.

A longitudinally extending shaft 15 is shown rotatably supported in suitable bearings provided in the upright posts 2 and 3 at each side of the apparatus. Each shaft 15 has secured thereto, adjacent each end thereof, a pair of eccentrics 16 which are aligned with and engage the studs 13 so that when the shafts 15 are rotated, vertical movement is transmitted to the longitudinally extending load-engaging members 11 through the studs 13 and guide rods 12, as will be understood.

Figure 8:
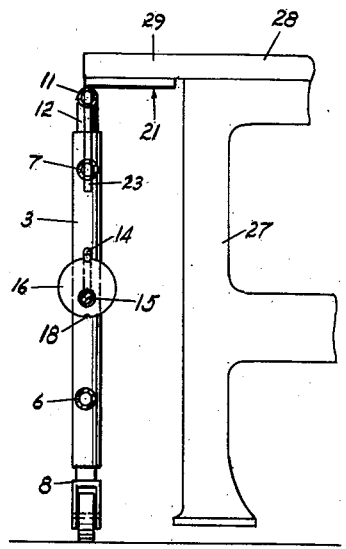
Figure 8 is a similar view showing the apparatus operated to bodily lift the machine to be transported off the floor.

A suitable operating handle or lever 17 is secured to each shaft 15 at the rear end of the apparatus, whereby an operator may quickly move the load-engaging members 11 into engagement with a load, when said members have been properly positioned with respect thereto, as shown for example in Figures 7 and 8.

The periphery of each eccentric 16 is preferably provided with diametrically opposed recesses 18 and 19 adapted to alternately receive the studs 13, and whereby the shafts 15 may be retained in adjusted position, without any worry on the part of the operator.

Auxiliary load engaging elements, generally designated by the numeral 21, are provided on each side member 11. Each element 21 is shown comprising an elongated plate 22 having one end secured to an upright shaft or rod 23 which is mounted for vertical adjustment in suitable aligned guide openings provided respectively in the upper load engaging rails 11 and the side members 7 at each side of the frame of the apparatus. The length of the guide rods 23 of the auxiliary element 21 is sufficient to assure that the lower ends thereof will not become disengaged from the guide openings in the side frame members 7, when the auxiliary elements 21 are relatively elevated in the side frame members 11, by manipulation of the shafts 15.

To adapt the apparatus for lifting objects of relatively greater height than indicated in Figure 3, the shanks or rods 23 of the auxiliary load-engaging elements 21 may be provided with spaced apertures 24 adapted to selectively receive pins 25, which pins when received in the corresponding apertures of their respective auxiliary members 21, will retain such elements on a common plane or level which will be determined by the height of the load to be elevated. The pins 25 may be inseparably secured to their respective elements 21 by suitably connecting cords or chains 26, as shown in Figure 6.

In the operation of the novel apparatus herein disclosed, the wheeled frame is maneuvered into position about the object or article to be conveyed or transported, as indicated by dotted lines in Figures 3 and 4. In these figures, there is illustrated, for the sake of disclosure, a conventional knitting machine table comprising a supporting frame 27 normally supported on the floor, as indicated in Figure 3, and has a table top 28 provided with overhanging side portions 29. If the width of the table top is sufficiently wide to overhang the load-engaging side members 11 of the apparatus, when the latter are moved into lifting position with respect to the load, as shown for example in Figure 7, the operator may simply swing the operating handles 17 from their upright positions, shown in Figure 1, to their lower-most positions, as indicated by dotted lines in Figure 2, whereby the lifting members 11 will engage the overhanging portions 29 of the table top 28 and thereby lift the sewing machine off the floor, as shown in Figure 8. When thus elevated off the floor the entire weight of the sewing machine or other object to be transported, will be transferred onto the wheeled frame constituting the present invention, whereby the swing machine, or other apparatus may be conveniently transported from one place to another without effort, as will be understood.

In Figures 7 and 8, the auxiliary load-engaging elements 21 are shown positioned on the rails 11. It is to be understood that if desired, these auxiliary elements may be dispensed with if the objects or machines to be transported are always of such width that the load-engaging rails 11 of the apparatus will always engage beneath the over-hanging top portions 29 thereof, as illustrated in Figures 7 and 8.

Figure 1:
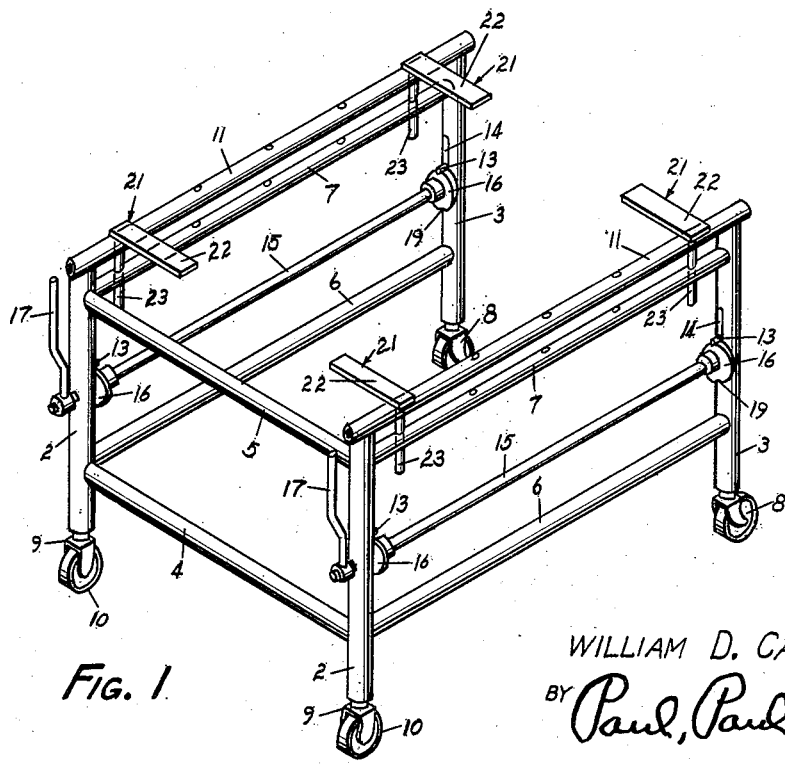
Figure 1 is a perspective view showing the improved load transporting apparatus herein disclosed.

The auxiliary elements 21 are extremely helpful when an apparatus having a table top which may be relatively narrower than the space between the members 11—11, in which case, the auxiliary elements 21 may be supported as shown in Figures 1 and 4, to thereby assure positive engagement with the load before attempting to elevate the latter from the floor.

In the drawings I have shown the apparatus constructed of tubular steel, but it is to be understood that it may be constructed of other material without departing from the scope of the invention, if so desired. Tubular steel is light in weight, and may be conveniently grasped by the hands, as hereinbefore stated, which makes it more desirable for use in such an apparatus.

It will also be noted by reference to Figures 1 and 4 that the cross rails 4 and 5 are each shown made of one piece of tubular structure, whereby the spacing between the load-engaging members of the apparatus will always remain constant. If desired, the cross members 4 and 5 may be made telescopic, whereby the spacing between the load-engaging members 11 may be varied to suit the load.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an apparatus of the class described, a rectangular wheeled frame open at one end whereby it may be maneuvered into position about an article to be transported thereby, spaced parallel load-engaging members mounted for vertical adjustment on said frame at each side thereof, each of said members having depending guide rods secured thereto and receivable in guides provided in said frame, a transversely disposed horizontal shaft mounted beneath each load-engaging member, eccentrics on said shafts, means secured to said guides and operatively engaging the peripheries of said eccentrics, and means for rotating said shafts to move the load-engaging members into or out of operative engagement with an object or load to be moved.

2. In an apparatus of the class described, an open structural frame mounted on suitable carrying wheels and open at one end, a longitudinally extending load-engaging member at each side of said frame adapted to be positioned beneath a load or object to be transported upon said frame, said members having depending guide rods secured thereto and received in guides in said frame, means extending laterally from said guide rods, rotary elements engageable with said laterally extending means for vertically translating said load-engaging member on the frame to bodily lift a load from the floor and transfer its weight onto said wheeled frame, and auxiliary load-engaging elements adjustably supported on said load-engaging members whereby the apparatus may be utilized for transporting loads of various widths.

3. In an apparatus of the class described, a wheeled frame open at its forward end whereby it may be maneuvered into position about an article to be transported thereby, said frame comprising tubular corner posts, a horizontally disposed load-engaging member mounted at each side of the frame and each having depending guide rods telescopically received in the corner posts of its respective side of the frame, slots in the walls of said posts, studs secured to said guide rods and outwardly projecting through said slots, cam means mounted on said corner posts adjacent to said outwardly projecting studs and engaged with said studs, and means for actuating said cam means whereby the load-engaging members are vertically adjusted with respect to said corner posts, thereby to move said members into or out of operative engagement with an article or load.

4. In an apparatus of the class described, a wheeled frame open at its forward end whereby it may be maneuvered into position about an article to be transported thereby, said frame comprising tubular corner posts, a horizontally disposed load-engaging member mounted at each side of the frame and each having depending guide rods telescopically received in the corner posts of its respective side of the frame, slots in the walls of said posts, studs secured to said guide rods and outwardly projecting through said slots, eccentrics mounted on said corner posts adjacent to said outwardly projecting studs and having their peripheries engaging said studs, means for rotating the eccentrics whereby the load-engaging members are vertically adjusted with respect to said corner posts, thereby to move said members into or out of operative engagement with an article or load, and means operatively associated with said eccentrics for securing them in load-lifting positions.

5. In an apparatus of the class described, a wheeled frame open at its forward end whereby it may be maneuvered into position about an article to be transported thereby, said frame comprising tubular corner posts, a horizontally disposed load-engaging member mounted at each side of the frame and each having depending guide rods telescopically received in the corner posts of its respective side of the frame, slots in the walls of said posts, studs secured to said guide rods and outwardly projecting through said slots, a shaft mounted on each side of said frame, eccentrics secured to said shafts adjacent to said outwardly projecting studs and having their peripheries engaging said studs, means for rotating the shafts whereby the eccentrics are actuated to vertically adjust the load-engaging members on said frame, thereby to move said members into or out of operative engagement with an article or load, and recesses in the peripheries of said eccentrics for receiving said studs and thereby securing the eccentrics in load-lifting positions.

WILLIAM D. CAMPBELL.

REFERENCES CITED

The following references are of record in the file of this patent:

UNITED STATES PATENTS

| Number | Name | Date |
| --- | --- | --- |
| 1,133,804 | Kaufman | Mar. 30, 1915 |
| 1,202,948 | Wollbrandt | Oct. 31, 1916 |
| 1,239,771 | Collis | Sept. 11, 1917 |
| 1,261,428 | Norman | Apr. 2, 1918 |
| 1,556,366 | Smouse | Oct. 6, 1925 |
| 1,927,598 | Schlichter | Sept. 19, 1933 |

FOREIGN PATENTS

| Number | Country | Date |
| --- | --- | --- |
| 242,736 | Great Britain | Nov. 19, 1925 |